(12) United States Patent
Kohl et al.

(10) Patent No.: US 11,782,836 B1
(45) Date of Patent: Oct. 10, 2023

(54) MULTIPROCESSOR SYSTEM CACHE MANAGEMENT WITH NON-AUTHORITY DESIGNATION

(71) Applicant: INTERNATIONAL BUSINESS MACHINES CORPORATION, Armonk, NY (US)

(72) Inventors: Jason D Kohl, Austin, TX (US); Winston Herring, Austin, TX (US); Tu-An T. Nguyen, Austin, TX (US); Gregory William Alexander, Pflugerville, TX (US); Timothy Bronson, Round Rock, TX (US); Christian Jacobi, West Park, NY (US)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 17/657,169

(22) Filed: Mar. 30, 2022

(51) Int. Cl.
*G06F 12/084* (2016.01)
*G06F 9/38* (2018.01)
*G06F 12/0815* (2016.01)

(52) U.S. Cl.
CPC .......... *G06F 12/084* (2013.01); *G06F 9/3834* (2013.01); *G06F 12/0815* (2013.01)

(58) Field of Classification Search
CPC .. G06F 12/084; G06F 12/0815; G06F 9/3834; G06F 12/0846
USPC ................................................ 711/168, 118
See application file for complete search history.

(56) References Cited

U.S. PATENT DOCUMENTS

| | | | |
|---|---|---|---|
| 10,097,628 B2 | 10/2018 | Xu | |
| 10,528,519 B2 | 1/2020 | Rosenbluth | |
| 10,671,532 B2 | 6/2020 | Zoellin | |
| 10,705,960 B2 | 7/2020 | Hum | |
| 10,802,966 B2 | 10/2020 | Iyengar | |
| 11,010,210 B2* | 5/2021 | Sonnelitter, III | ... G06F 12/0811 |
| 11,543,972 B1* | 1/2023 | Okada | .................. G06F 3/0658 |
| 2002/0046322 A1* | 4/2002 | Butterworth | ........ G06F 11/2089 |
| | | | 714/E11.091 |
| 2016/0147662 A1 | 5/2016 | Drapala | |

OTHER PUBLICATIONS

Anonymous. "Implementing locks in a shared-memory multiprocessor using a simplified coherence protocol." Published Sep. 24, 2010 by IP.com. 6 pages. https://priorart.ip.com/IPCOM/000200052.

(Continued)

*Primary Examiner* — Hashem Farrokh
(74) *Attorney, Agent, or Firm* — Matthew Zehrer (57) ABSTRACT

A primary controller has authority of a cache line associated with a fetch and manages a second cache line request from a different and non-associated secondary requesting entity. A secondary controller, associated with the secondary requesting entity, is granted authority of the cache line and further manages multiple subsequent simultaneous or overlapping requests for the cache line from different non-associated subsequent requesting entities by maintaining authority of the cache line, by granting read-only access to the cache line to respective subsequent controllers, each associated with a different subsequent requesting entity, and by passing a non-authority token to each of the respective subsequent controllers.

20 Claims, 6 Drawing Sheets

(56) References Cited

OTHER PUBLICATIONS

Anonymous. "Method and System for Allowing Access to Data Locked by a State Machine for Eviction in a Multilevel Write Back Cache." Published Jun. 17, 2014 by IP.com. 3 pages. https://priorart.ip.com/IPCOM/000237412.
Anonymous. "Speculative Cache Data Read." Published Jun. 19, 2012 by IP.com. 3 pages. https://priorart.ip.com/IPCOM/000219117.
Bethel, et al., "Using High-Speed WANs and Network Data Caches to Enable Remote and Distributed Visualization." 23 pages. In SC '00: Proceedings of the 2000 ACM/IEEE Conference on Supercomputing, 2000, pp. 28-28, doi: 10.1109/SC.2000.10002.
Kaxiras, S., "Identification And Optimization Of Sharing Patterns For Scalable Shared-Memory Multiprocessors." Published Feb. 1970. 265 pages. Published by Research Gate. https://www.researchgate.net/publication/2513285_Identification_And_Optimization_Of_Sharing_Patterns_For_Scalable_Shared-Memory_Multiprocessors.

\* cited by examiner

MULTIPROCESSOR SYSTEM CACHE MANAGEMENT WITH NON-AUTHORITY DESIGNATION

BACKGROUND

Various embodiments of the present application generally related to cache management in a multiprocessing (MP) system.

Modern processor chips continue to hold increased numbers of central processing unit (CPU) cores. As a result, the number of CPU cores connected to a shared cache and memory continues to also increase to support growing workload capacity demand. The increasing number of CPUs cooperating to process the same workloads puts a significant burden on cache hierarchy design. Multiple CPU cores requesting data from the same memory address in a shared memory leads to address contention. These address contention events lead to inefficient computing and latency issues.

SUMMARY

In an embodiment of the present invention, a computer-implemented method is presented. The method includes receiving, by a first controller, a fetch request for data of a cache line from each of a plurality of subsequent controllers. The method further includes performing, by the first controller, an address compare using a memory address of the data. The method further includes, in response to the memory address matching a memory address stored in the first controller, maintaining, by the first controller, authority of the cache line. The method further includes transmitting, by the first controller, a respective non-authority token to the each of the plurality of subsequent controllers. The method further includes in response to each of the plurality of subsequent controllers holding the respective non-authority token, transmitting, with first controller, the data to each of the plurality of subsequent controllers.

In another embodiment of the present invention, a system is presented. The system includes a memory having computer readable instructions. The system further includes one or more processors for executing the computer readable instructions. The computer readable instructions control the one or more processors to perform operations. The operations include receiving, by a first controller, a fetch request for data of a cache line from each of a plurality of subsequent controllers. The operations further include performing, by the first controller, an address compare using a memory address of the data. The operations further include, in response to the memory address matching a memory address stored in the first controller, maintaining, by the first controller, authority of the cache line. The operations further include transmitting, by the first controller, a respective non-authority token to the each of the plurality of subsequent controllers. The operations further include in response to each of the plurality of subsequent controllers holding the respective non-authority token, transmitting, with first controller, the data to each of the plurality of subsequent controllers.

In yet another embodiment of the present invention, a computer program product includes a computer readable storage medium having program instructions embodied therewith. The program instructions are executable by a processor to cause the processor to perform operations. The operations include receiving, by a first controller, a fetch request for data of a cache line from each of a plurality of subsequent controllers. The operations further include performing, by the first controller, an address compare using a memory address of the data. The operations further include, in response to the memory address matching a memory address stored in the first controller, maintaining, by the first controller, authority of the cache line. The operations further include transmitting, by the first controller, a respective non-authority token to the each of the plurality of subsequent controllers. The operations further include in response to each of the plurality of subsequent controllers holding the respective non-authority token, transmitting, with first controller, the data to each of the plurality of subsequent controllers.

These and other embodiments, features, aspects, and advantages will become better understood with reference to the following description, appended claims, and accompanying drawings.

BRIEF DESCRIPTION OF THE DRAWINGS

In accordance with common practice, the various features illustrated in the drawings may not be drawn to scale. Accordingly, the dimensions of the various features may be arbitrarily expanded or reduced for clarity. In addition, some of the drawings may not depict all the components of a given system, method, or device. Finally, like reference numerals may be used to denote like features throughout the specification and Figures.

DETAILED DESCRIPTION

Applications executed on modern multiprocessor (MP) system hardware necessitate data sharing. Periodically, multiple processing cores request data from the same address of a shared memory storage. These address contention events diminish MP performance by introducing latencies, increased executions times, and inefficient use of resources. Various mechanisms have been used to manage address contention events including locks, semaphores, mutexes, and queues. Conventionally, developers employ these mechanisms to design cache hierarchies that manage address contention events through various techniques including request serialization and request reordering. However, these approaches introduce their own system performance inefficiencies in the form of increased controller utilization, inefficient use of bus/interface bandwidth, and introduction of additional operational latency.

In a traditional MP system architecture, processor core requests are arbitrated and presented to a memory architecture that serializes data returns. The processor core's request moves through the architecture and initiates a cache-access and associated directory lookup, checks resource availability, and checks if any other core controls the cache line. If the cache line has no controller, the current core assumes control and sets a lock to prevent other cores from accessing the cache line data. This lock remains active until the request has been satisfied. As a subsequent core requests the cache line data, its associated controller performs an address compare to determine if another core currently controls the cache line and is currently accessing the cache line data or if another core is ahead in line for control of the cache line. These controllers essentially form a serialized linked list that forms an order of cache line control and corresponding order that cache line data is accessed.

During the time that the current core assumes control of the cache line, each secondary requester is locked out of the data until the current controller's request has been satisfied. The secondary requesters hold the requested cache line addresses in a register and perform address compares to determine if the address remains locked. The secondary requestors remain on hold until the cache line control is released. In these conventional systems, the secondary requestors only transmit and receive data in relation to their own requests. Additionally, the shared controller is unaware which cores are requesting the data and the operation types of the requests. This decentralized method of managing address contention events increases operational latencies and reduces efficient resource utilization.

One or more embodiments of the present invention address one or more of the above-described shortcomings by providing a controller management shame to manage secondary requests and associated data returns thereto. To facilitate an efficient processing of contended cache lines, a first controller that is unique to a first processing node assumes authority thereof. The first controller may track the identity of each subsequent requestor to read or fetch the cache line. To manage the subsequent requestors, the first controller maintains authority of the cache line, grants read-only access to the cache line, and transmits a non-authority token to the subsequent requestors. As such, the secondary requestors are not responsible to continuously monitor the data availability and are free to reset and address new instructions from their own unique processing nodes.

Figure 1:
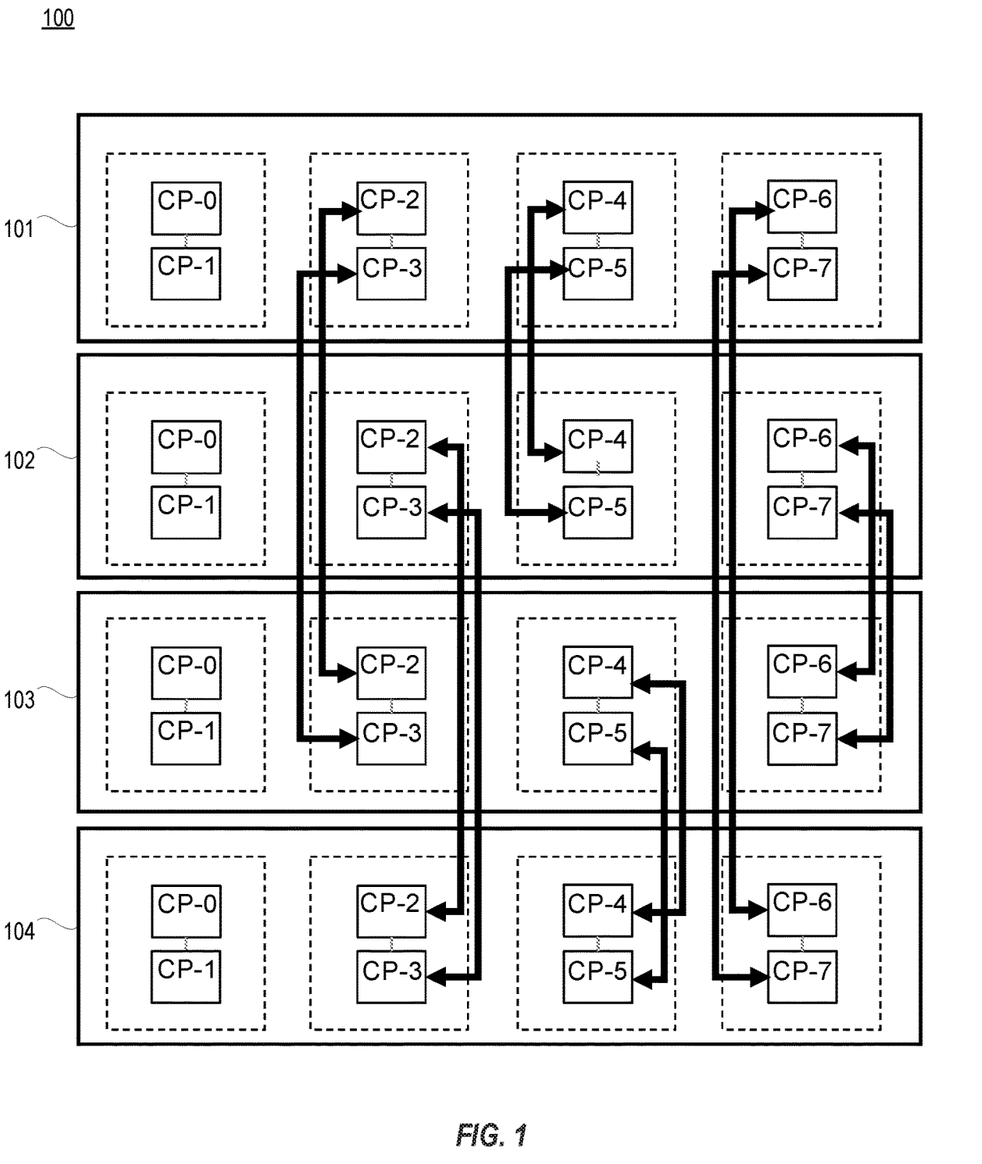
FIG. 1 depicts a block diagram of processing drawers for use in implementing one or more embodiments of the present invention.

FIG. 1 depicts a multiprocessor (MP) computer system 300 of four interconnected processing drawers 101, 102, 103, 104 in accordance with one or more embodiments of the present invention. Although FIG. 1 depicts a system 100 of four interconnected processing drawers, it should be appreciated that in other embodiments a system could include any number of processing drawers.

Figure 2:
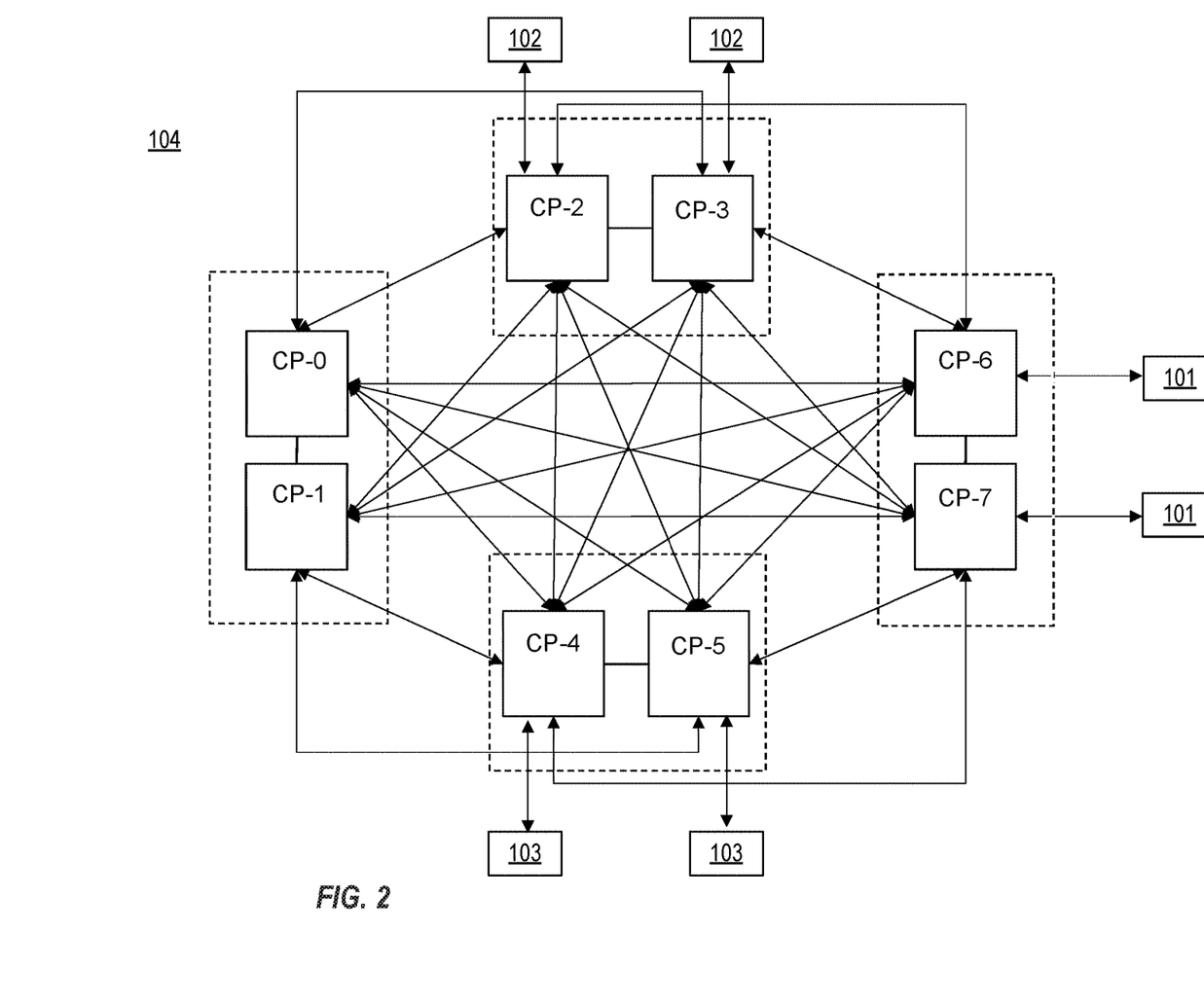
FIG. 2 depicts a block diagram of a processing drawer for use in implementing one or more embodiments of the present invention.

Processing drawers 101, 102, 103, 104 may include a plurality of processing chips, such as central processors (CPs). Two or more processing chips may be logically grouped and/or physically connected within a cluster. For example, as depicted, each processing drawer 101, 102, 103, 104 may include processing chips CP-0, CP-1, CP-2, CP-3, CP-4, CP-5, CP-6, and CP-7. Each of the processing chips, as is exemplarily depicted in FIG. 2, may communicate with one another within the same drawer via one or more internal buses. Each processing chip pair CP-0 and CP-1, CP-2 and CP-3, CP-4 and CP-5, and CP-6 and CP-7 may be logically grouped and/or physically connected within a different cluster.

Processing drawers 101, 102, 103, 104 may communicate with one another by communicatively connecting one or more processing chip(s) of a first processing drawer with a dedicated or exclusive one or more processing chip(s) of a second processing drawer. For example, as depicted, CP-2 and CP-3 of processing drawer 101 may be communicatively connected with CP-2 and CP-3 of processing drawer 103, CP-4 and CP-5 of processing drawer 101 may be communicatively connected with CP-4 and CP-5 of processing drawer 102, and CP-6 and CP-7 of processing drawer 101 may be communicatively connected with CP-6 and CP-7 of processing drawer 104, etc. Processing drawers 101, 102, 103, 104 may communicate with one another via one or more external bus that connect each processing drawer with another processing drawer, etc. The inter and intra processing drawer communication may be achieved by receiving and transmitting signals via a combination of such internal and external busses.

Figure 3:
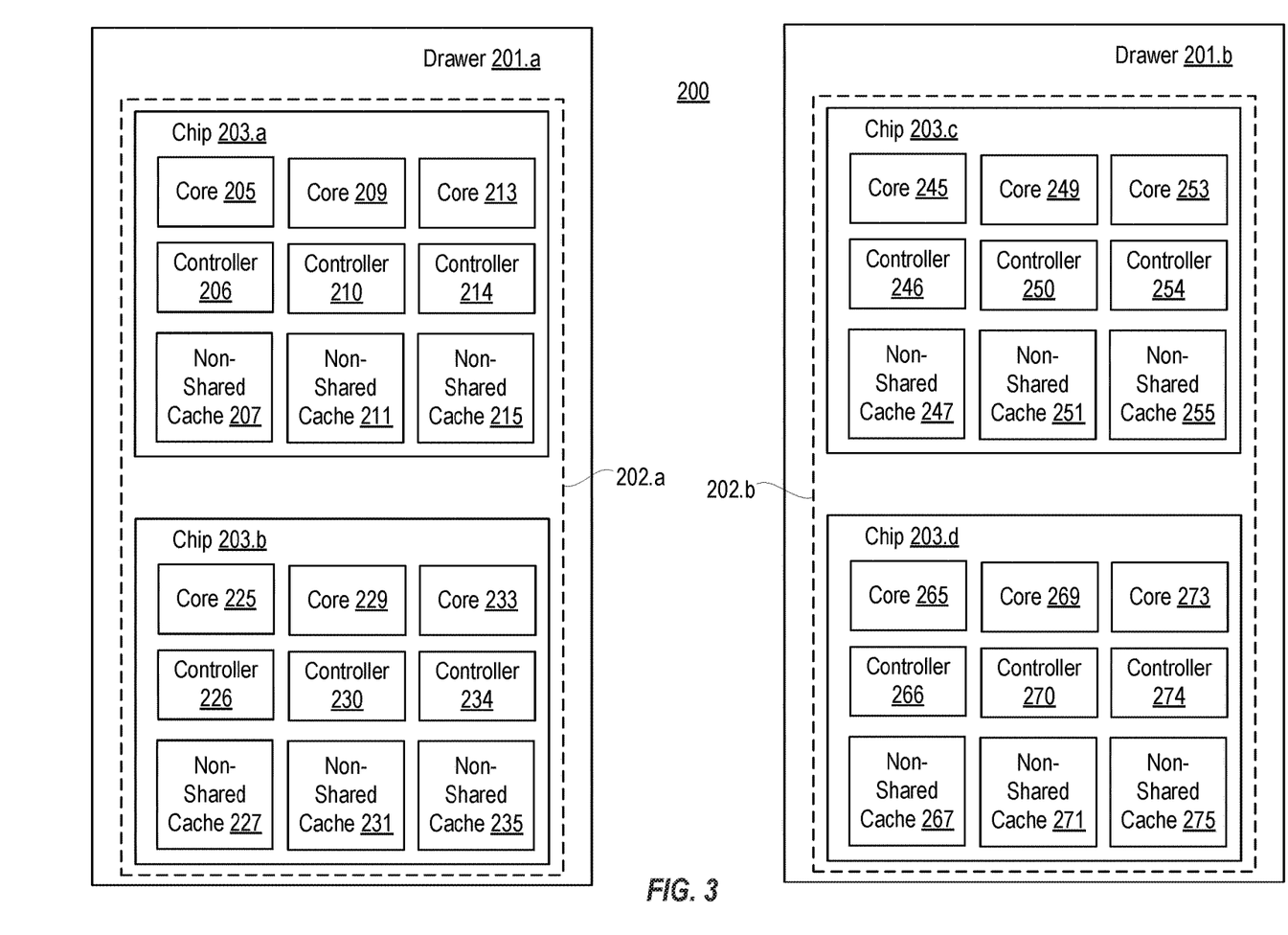
FIG. 3 depicts a block diagram of a computer system for use in implementing one or more embodiments of the present invention.

Referring to FIG. 3 a block diagram illustrating an exemplary multiprocessor (MP) computer system 200 is shown. MP computer system 200, such as system 100, includes multiple processing drawers 201.a, 201.b. Each processing drawer 201.a, 201.b may include processing chips. For example, processing drawer 201.a may include processing chip 203.a and processing chip 203.b which may be logically grouped and/or physically connected within cluster 202.a. Similarly, processing drawer 201.b may include processing chip 203.c and processing chip 203.d which may be logically grouped and/or physically connected within cluster 202.b.

Although only one cluster 202 is shown in each processing drawer 201, it should be appreciated that an MP system 200 may include multiple clusters 202 within each processing drawer 201. Similarly, although two processing chips 203 are depicted within a cluster 202, it should be appreciated that cluster 202 may include any number of processing chips 203 to execute its desired functionality.

Each processing chip 203 includes one or more processors but can include fewer or additional processors. Each processor includes one or more cores. For example, each depicted processing chip may include three processors with each processor having a single core. Each core is configured to be in operative communication with a non-shared cache and a controller. The non-shared cache is dedicated to a single or unique core. In other words, the non-shared cache is not shared or utilized by different cores.

Each controller is configured to access data in its associated non-shared cache and to access data in shared storage, such as a shared cache (not shown), main memory (not shown), or the like. The shared storage may include physical memory storage that is internal to the MP computer system 200. Main memory is sometimes referred to as random access memory (RAM) or primary storage. The main memory may provide storage for program instructions and data for execution and fetching during data processing. Program instructions and data contained on external sources, for example, discs, flash drives, and USB sticks may be copied onto main memory prior to execution by one or more of the cores.

In some embodiments the non-shared cache may be level 1 (L1) cache and/or level 2 (L2) cache and the shared cache may be level 3 (L3) cache. The L1 cache is the smallest cache and is located closest to the core. In some embodiments, the L1 cache is split between a data cache and an instructions cache. The L2 cache may be larger than the L1 cache and located the second closest to the processor core. In some embodiments, the L1 cache and L2 cache can employ an inclusive design and store duplicated data from one cache onto the other cache. In other embodiments, the L1 cache and L2 cache employ an exclusive design and not share any data. The L1 cache and the L2 cache may be located on the CP chip 203. The L3 cache may provide memory storage for multiple processing cores. In conventional systems, the L3 cache is usually assigned to a predetermined set of processor cores.

In the depicted example, processing chip 203.a includes one or more processors. The one or more processors include cores 205, 209, 213, controllers 206, 210, and 214, and non-shared cache 207, 211, and 215. Each core 205, 209, and 213 is unique or distinct. Similarly, each non-shared cache 207, 211, and 215 is unique or distinct. Core 205 is configured to be in operative communication with non-shared cache 207 and controller 206. Core 209 is configured to be in operative communication with non-shared cache 211 and controller 210. Core 213 is configured to be in operative communication with non-shared cache 215 and controller 214. Non-shared cache 207 is dedicated to and solely utilized by core 205, non-shared cache 211 is dedicated to and solely utilized by core 209, and non-shared cache 215 is dedicated to and solely utilized by core 213. Because core 205 and non-shared cache 207 are unique or distinct, controller 206 may be dedicated to and solely utilized by core 205 and non-shared cache 207. Similarly, controller 210 may be dedicated to and solely utilized by core 209 and non-shared cache 211 and controller 214 may be dedicated to and solely utilized by core 213 and non-shared cache 215.

Further in the depicted example, processing chip 203.b includes one or more processors. The one or more processors include cores 225, 229, 233, controllers 226, 230, and 234, and non-shared cache 227, 231, and 235. Each core 225, 229, and 233 is unique or distinct. Similarly, each non-shared cache 227, 231, and 235 is unique or distinct. Core 225 is configured to be in operative communication with non-shared cache 227 and controller 226. Core 229 is configured to be in operative communication with non-shared cache 231 and controller 230. Core 233 is configured to be in operative communication with non-shared cache 235 and controller 234. Non-shared cache 227 is dedicated to and solely utilized by core 225, non-shared cache 231 is dedicated to and solely utilized by core 229, and non-shared cache 235 is dedicated to and solely utilized by core 233. Because core 225 and non-shared cache 227 are unique or distinct, controller 226 may be dedicated to and solely utilized by core 225 and non-shared cache 227. Similarly, controller 230 may be dedicated to and solely utilized by core 229 and non-shared cache 231 and controller 234 may be dedicated to and solely utilized by core 233 and non-shared cache 235.

Further in the depicted example, processing chip 203.c includes one or more processors. The one or more processors include cores 245, 249, 253, controllers 246, 250, and 254, and non-shared cache 247, 251, and 255. Each core 245, 249, and 253 is unique or distinct. Similarly, each non-shared cache 247, 251, and 255 is unique or distinct. Core 245 is configured to be in operative communication with non-shared cache 247 and controller 246. Core 249 is configured to be in operative communication with non-shared cache 251 and controller 250. Core 253 is configured to be in operative communication with non-shared cache 255 and controller 254. Non-shared cache 247 is dedicated to and solely utilized by core 245, non-shared cache 251 is dedicated to and solely utilized by core 249, and non-shared cache 255 is dedicated to and solely utilized by core 253. Because core 245 and non-shared cache 247 are unique or distinct, controller 246 may be dedicated to and solely utilized by core 245 and non-shared cache 247. Similarly, controller 250 may be dedicated to and solely utilized by core 249 and non-shared cache 251 and controller 254 may be dedicated to and solely utilized by core 253 and non-shared cache 255.

Further in the depicted example, processing chip 203.d includes one or more processors. The one or more processors include cores 265, 269, 273, controllers 266, 270, and 274, and non-shared cache 267, 271, and 275. Each core 265, 269, and 273 is unique or distinct. Similarly, each non-shared cache 267, 271, and 275 is unique or distinct. Core 265 is configured to be in operative communication with non-shared cache 267 and controller 266. Core 269 is configured to be in operative communication with non-shared cache 271 and controller 270. Core 273 is configured to be in operative communication with non-shared cache 275 and controller 274. Non-shared cache 267 is dedicated to and solely utilized by core 265, non-shared cache 271 is dedicated to and solely utilized by core 269, and non-shared cache 275 is dedicated to and solely utilized by core 273. Because core 265 and non-shared cache 267 are unique or distinct, controller 266 may be dedicated to and solely utilized by core 265 and non-shared cache 267. Similarly, controller 270 may be dedicated to and solely utilized by core 269 and non-shared cache 271 and controller 274 may be dedicated to and solely utilized by core 273 and non-shared cache 275.

Figure 4:
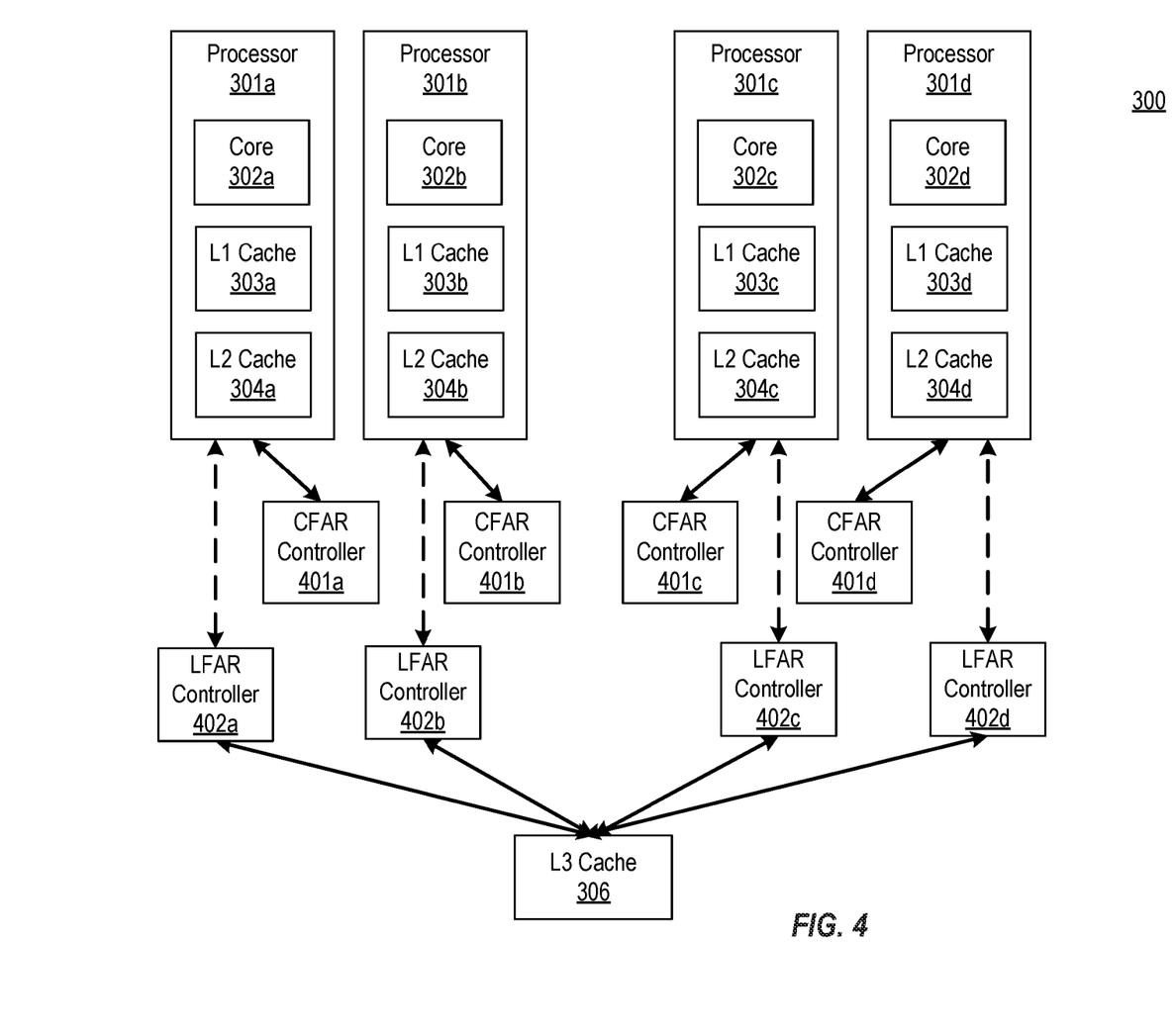
FIG. 4 depicts a block diagram of a computer system, according to one or more embodiments of the invention.

Referring to FIG. 4 a block diagram illustrating an exemplary multiprocessor (MP) computer system 300 is shown. As illustrated, four processors 301a, 301b, 301c, 301d are shown, that respectively include one or more cores 302, a level 1 (L1) cache 303, and a level 2 (L2) cache 304. Each processor 301a, 301b, 301c is configured to be in operative communication with one or more associated data controllers. As described above, the data controllers may be configured to access data from the level 2 (L2) cache 304, the level 3 (L3) cache 306 and the level 4 (L4) cache (not shown) and is in operable communication with SC chip 205 (not shown).

In an embodiment, the L2 cache level is comprised of a group of distinct hardware cache components, each associated with one core in the same processor. In another embodiment, the L2 cache level may be comprised of virtualized or logical hardware cache components. Because of the virtualized nature of this L2 cache level, the logical or virtual grouping of L2 cache effectively forms a higher-level cache (e.g., the virtual L2 cache level effectively forms a L3 cache) that may be shared by different cores, processors, etc.

Similarly, in an embodiment, L3 cache 306 is a hardware cache, each associated with multiple processors 301 of the same CP chip. In another embodiment, the L3 cache level may be comprised of virtualized or logical hardware cache components. Because of the virtualized nature of this L3 cache level, the logical or virtual grouping of L3 cache effectively forms a higher-level shared cache (e.g., forms a virtual L4 cache) that may be shared by different cores, processors, processing drawers, etc.

Controller 401a, 401b, 401c, 401d is in operable communication with processor 301a, 301b, 301c, 301d, respectively. Referring to FIG. 4, the controllers, in some embodiments of the present invention, are core fetch address register (CFAR) controllers 401a, 401b, 401c, 401d, that hold the memory address(es) of the requested data.

The CFAR controllers 401a, 401b, 401c, 401d operate to manage requests entirely within one associated respective processor 301a, 301b, 301c, 301d. If there is a hit in the respective L1 cache 303 or L2 cache 203, the CFAR controller 401a, 401b, 401c, 401d manages the return of the data from L1 cache 303 or L2 cache 203 to the requesting associated processor(s) 301a, 301b, 301c, 301d . If there is a miss in the respective L1 cache 303 or L2 cache 203, the same or different controller(s) may manage the return of the data from L3 cache 306, L4 cache 310, main memory 307, etc. to the requesting associated processor(s) 301a, 301b, 301c, 301d, at least partially over the appropriate bus.

For example, local fetch address register (LFAR) controller(s) 402a, 402b, 402c, 402d holds the memory address(es) of the requested data manages the request from L3 cache 306, L4 cache 310, main memory 307 over the appropriate bus 109. Each LFAR controller(s) 402a, 402b, 402c, 402d are respectively in operable communication with more than one processor 301a, 301b, 301c, and/or 301d.

It should be appreciated that although FIG. 4 depicts CFAR and LFAR controllers, any type of controllers would suffice, in which multiple different controller types may be configured to be solely utilized by a dedicated core and dedicated non-shared cache and in which may be in operable communication with shared storage, such as main memory 307, that may be utilized by multiple cores, processors, or the like.

In a conventional system, when a requesting processor issues a data request to a shared cache, such as L3 cache, virtual L2 cache level, etc., the address is loaded onto an associated requesting controller. Address compare circuitry compares the address loaded onto the requesting controller with any addresses of requested data of other processors.

In the conventional system, if the address of the requested data does not match any address that is currently being requested by the other processors, the requesting controller is granted control of the associated cache line. If the address of the requested data does match any address that is currently being requested by the other processors, the requesting controller remains in a hold position until the other associated current controller is released of control of the associated cache line.

In the conventional system, any subsequent controller requesting the data will in turn also remain on hold until the cache line is available. The requesting controller, associated with the issuing processor, is eventually granted control, and retrieves the cache line data and transmits the data to it its associated issuing processor. The subsequent controllers are granted control and receive the data in a serialized fashion based upon a known or predetermined algorithm (e.g., upon the order that associated requests were received, upon the opposite order that requests were received, etc.). This results in serialized control of the requests by the controllers and a serialized management of data returns.

Figure 5:
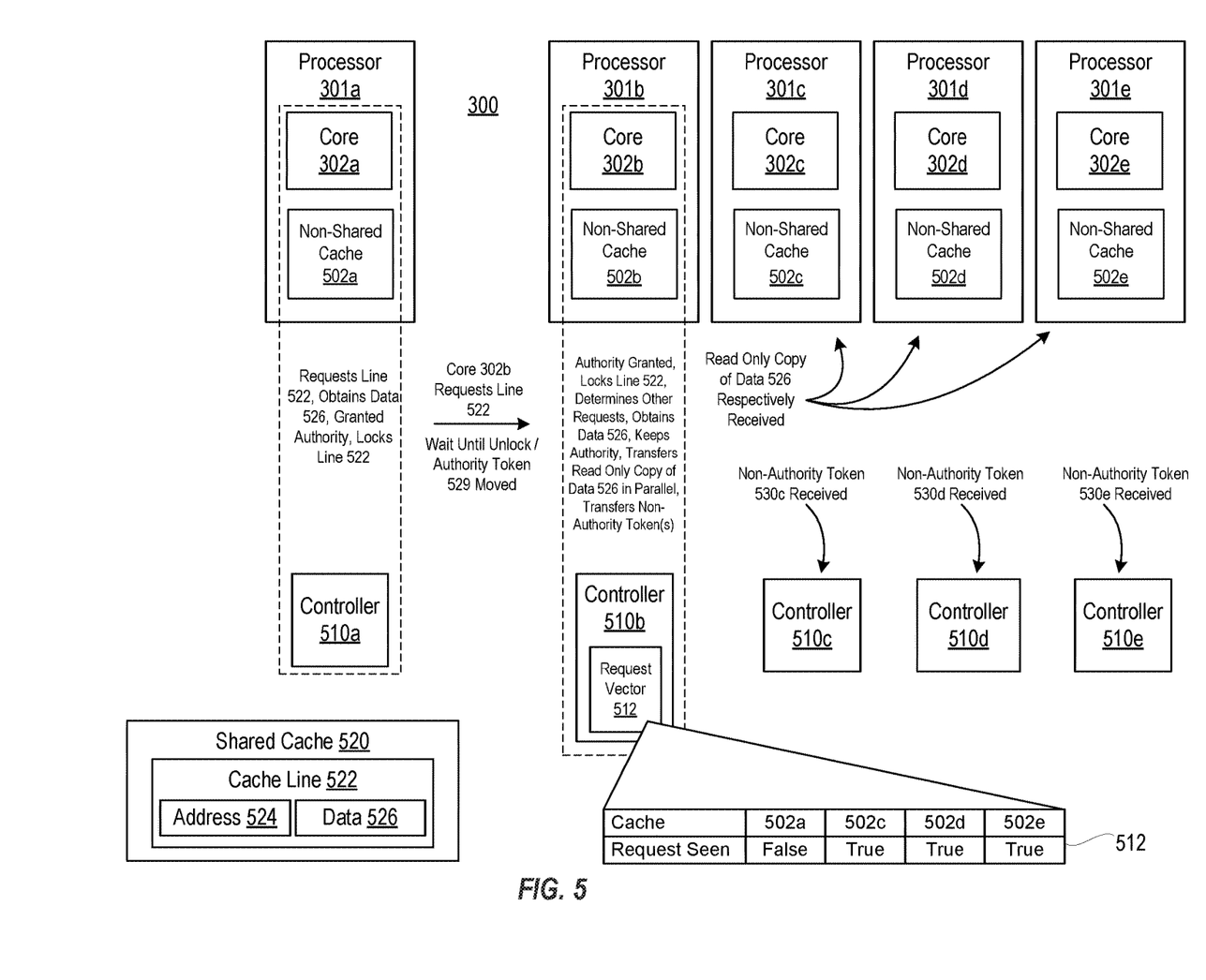
FIG. 5 depicts a block diagram of a computer system, according to one or more embodiments of the invention.

Referring to FIG. 5 a block diagram illustrating an exemplary MP computer system 300 is shown. As illustrated, five processors 301a, 301b, 301c, 301d, 301e are shown, that respectively include one or more cores 302, a cache 502 that is non-shared by another core 302, which may be hereinafter referred to as non-shared cache 502, and a cache 520 that is shared with one or more other cores 302, which may be hereinafter referred to as shared cache 520. In an embodiment, non-shared cache 502 may be L1 cache 303 and shared cache 520 may be a virtual L2 cache level. In another embodiment, non-shared cache 502 may be L2 cache 304 and shared cache 520 may be L3 cache 306.

Referring to FIG. 5, each processor 301a, 301b, 301c, 301d, 301e is depicted as including a single core 302a, 302b, 302c, 302d, 302e, respectively, each being associated with its own non-shared cache 502a, 502b, 502c, 502d, 502e. In other embodiments, one or more processors 301 may include multiple cores 302, with each core 302 thereof being associated with its own non-shared cache 502.

Each core 302a, 302b, 302c, 302d, 302e is configured to be in operative communication with one or more data controllers. As described above, the data controllers may be configured to access data from its dedicated non-shared cache and to access data from shared storage, such as shared cache 520.

Controllers 510a, 510b, 510c, 510d, 510e are respectively in operable communication with core 302a, 302b, 302c, 302d, 302e. Referring to FIG. 5, the controllers 510a, 510b, 510c, 510d, 510e, in some embodiments of the present invention, are CFAR controllers 401 respectively in operable communication with core 302a, 302b, 302c, 302d, 302e. In some embodiments of the present invention, controllers 510a, 510b, 510c, 510d, 510e are LFAR controllers 402 respectively in operable communication with core 302a, 302b, 302c, 302d, 302e. In still other some embodiments of the present invention, controllers 510a, 510b, 510c, 510d, 510e are any number or types of controllers, with each one or more series of controllers being respectively in operable communication with core 302a, 302b, 302c, 302d, 302e.

In embodiments of the present system, a primary controller 510 assumes authority of a cache line associated with a primary fetch. To maintain cache line coherency, a single controller 510 may have authority of any one cache line at any given time.

Subsequently, primary controller 510 may further receive a secondary request to fetch the cache line from a secondary core 302. Associated with such request, a secondary controller 510 uniquely associated with the secondary core 302 eventually assumes or is granted authority of the cache line. This secondary controller 510 may be referred to herein as secondary controller, to reflect its temporal authority relation to the primary controller 510. Subsequently, the secondary controller 510 manages multiple simultaneous or overlapping requests from different subsequent or tertiary cores 302 for the cache line by maintaining authority of the cache line, by granting read-only access to the cache line to the different cores 302, and by passing a non-authority token 530 to the controllers 510 associated with the different cores 302, respectively. These subsequent or tertiary controllers 510 may be referred to herein as a subsequent or tertiary controllers, to reflect their temporal relation to the primary controller 510, secondary controller 510, etc.

In the depicted example, a first core 302a makes a request to fetch data 526 and initially searches its non-shared cache 502a. It should be appreciated that although FIG. 5 illustrates a first core 302a making the request, the request can be made by any requesting agent. For example, the requesting agent includes a processor agent, a cache agent, or any other appropriate agent. If the requested data 526 is not found in non-shared cache 502a, the first core 302a controller 510a initiates a request to fetch the data 526 from a higher-level memory, such as shared cache 520. Controller 510a performs an address 524 compare to determine if the data 526 is being used by another core 302b, 302c, 302d, 302e. If the data 526 is not being used, controller 510a fetches the data 526 and returns it to the first core 302a.

If the first core 302a is accessing the data 526 for a read or write operation, controller 510a may use a synchronization mechanism to obtain authority of the cache line 522 and lock out the other core 302b, 302c, 302d, 302e from accessing the data 526 until the first core 302a releases authority of the cache line 522. An example of a synchronization mechanism is a mutex. A mutex is a mechanism that operates to enforce limits on access to a resource in a multi-thread environment. Therefore, even if two different cores 302 try to fetch the data 526 at the same time, one of the cores 302 will be blocked until the other one releases it. Another synchronization mechanism is a bus arbitrator, which permits only the first processor that contains the core 302a to control the bus that links the first processor to any connected processors.

Controller 510a periodically receives an address compare request from a secondary requestor controller 510. If the address of the requested data (not shown) does not match any address requested by any other core 302, the requesting secondary requestor controller 510 is granted authority of the associated cache line (not shown). Alternatively, when the address 524 of the requested data 526 does match a previous address 524 requested another core 302 (e.g., core 302a), the requesting secondary requestor controller 510 remains in a hold position until the primary controller (e.g., controller 510a) is released of authority of the associated cache line 522.

For example, as depicted, controller 510a subsequently receives an address compare request from secondary requestor controller 510b. If the address of the requested data (not shown) does not match any address requested by any other core 302, controller 510b is granted authority of the associated cache line (not shown). Alternatively, when the address 524 of the requested data 526 does match the previous address 524 requested by core 302a, controller 510b remains in a hold position until the primary controller 510a is released of authority of the associated cache line 522. Eventually, controller 510b is granted authority of cache line 522 and retrieves data 526 and transmits the data 526 to its associated core 302b.

As part of the process, controller 510a and controller 510b exchange information to establish that controller 510b has authority of the cache line 522. The exchange of information includes the process of negotiation between controller 510a and controller 510b and establishes the protocols prior to data 526 transfer. As part of the exchange of information, the controller 510a and controller 510b may exchange authority token 529, a pre-existing authority token in controller 510a may be revoked and an authority token may be obtained by controller 510b, or the like.

The authority token 529 may include an identity the one controller that has authority over an associated cache line, the identity of any associated other sub-controllers that may own the cache line and that are related to the controller that has authority, or the like. Cache line ownership by one or more controllers may mean that such one or more controllers have a copy of the cache line. Therefore, only one controller maybe both an owner of a cache line and the authority of the cache line.

The authority token 529 may further identify a type of operation associated with the cache line requested by the controller that has requested authority. The authority token 529 may further include an acceptance acknowledging that a new first controller has authority over the associated cache line from a previous first controller. Authority of the cache line is defined herein to mean the ability to give a copy of an associated cache line or move authority of the associated cache line to another controller. Authority can be transferred prior to movement of actual cache data, allowing the new first controller to claim to be the authority before it has acquired the associated data. In some embodiments, and is further described below, there may be multiple owners of a cache line, but only one authority of the cache line at each system level.

Controller 510b periodically receives an address compare request from a plurality of tertiary controllers 510. When the address of the requested data (not shown) does not match any address requested by any other core 302, the respective requesting tertiary controllers 510 are granted authority of the associated cache line (not shown). Alternatively, when the address 524 of the requested data 526 does match a previous address 524 requested by core 302a, the requesting plurality of tertiary controllers 510 remains in a hold position.

For example, as depicted, controller 510b periodically receives an address compare request from a plurality of tertiary controllers 510c, 510d, 510e. When different addresses of the requested data (not shown) do not match any address requested by any other core 302, the respective controllers 510c, 510d, 510e are granted authority of the associated cache line (not shown). In accordance with the embodiments, when tertiary controllers 510c, 510d, 510e request address 524, the requesting plurality of tertiary controllers 510c, 510d, 510e remain in a non-authority state and controller 510b remains the authority of cache line 522.

The first controller 510 may track or store the identity of the intervening requesting controllers 510 along with the type of operation prompting the request. For example, controller 510b may store the identity of the requesting controllers 510c, 510d, and 510e in request vector 512. Controller 510b may also track the operation type associated with the intervening requests in request vector 512 or within a queue, a table, or other appropriate data structure.

If the tertiary controllers 510 are accessing data 526 for a read-only operation, the first controller 510 transmits or allows a read-only copy of data 526 to be fetched in parallel by the other core(s) 302 associated therewith. In such case, a non-authority token 530 is transferred to the requesting tertiary controllers 510. For example, as depicted, if the tertiary controllers 510c, 510d, 510e are accessing data 526 for a read-only operation, the first controller 510b transmits or allows a read-only copy of data 526 to be fetched in parallel to/by the other core(s) 302c, 302d, 302e and a respective non-authority token 530c, 530d, 530d is transferred to the tertiary controllers 510c, 510d, 510e to respectively indicate non-authority of cache line 522. The non-authority token 530 may block controller 510, that receives the non-authority token 530, from claiming it has authority of the associated cache line, thus maintaining cache line 522 authority coherency.

As part of the process, controller 510b and tertiary controllers 510c, 510d, 510e exchange information to establish that authority of the cache line 522 is the still the responsibility of controller 510b. The exchange of information includes the process of negotiation between controller 510b and tertiary controllers 510c, 510d, 510e and establishes the protocols prior to the read-only data 526 transfer. As part of the exchange of information, the controller 510b and tertiary controllers 510c, 510d, 510e exchange a non-authority token 530c, 530d, 530e, respectively. The non-authority token 530c, 530d, 530d may include the identity of the maintained first controller 510b and the type of read-only operation associated therewith. The non-authority token 530c, 530d, 530e, may further include an acceptance, acknowledging that cache line 522 is still the authority of controller 510b, from the tertiary controllers 510c, 510d, 510e, respectively.

In some embodiments, the controller 510b may transmit the read-only data 526 in response to tertiary controllers holding an associated non-authority token. For example, upon the non-authority token 530c, 530d, 530e, being received by tertiary controllers 510c, 510d, 510e, respectively, the tertiary controllers 510c, 510d, 510e are allowed to fetch or otherwise obtain the data 526 simultaneously, at once, overlapping, or the like.

As such, embodiments of the present invention permit the first controller 510 to return cache line data in parallel to multiple processors, cores, or requesting agents while also ensuring that such receivers know that they do not have authority of the cache line associated with the received data. This improves resource utilization and processor stall times while enabling cache line authority coherency within the MP system.

Figure 6:
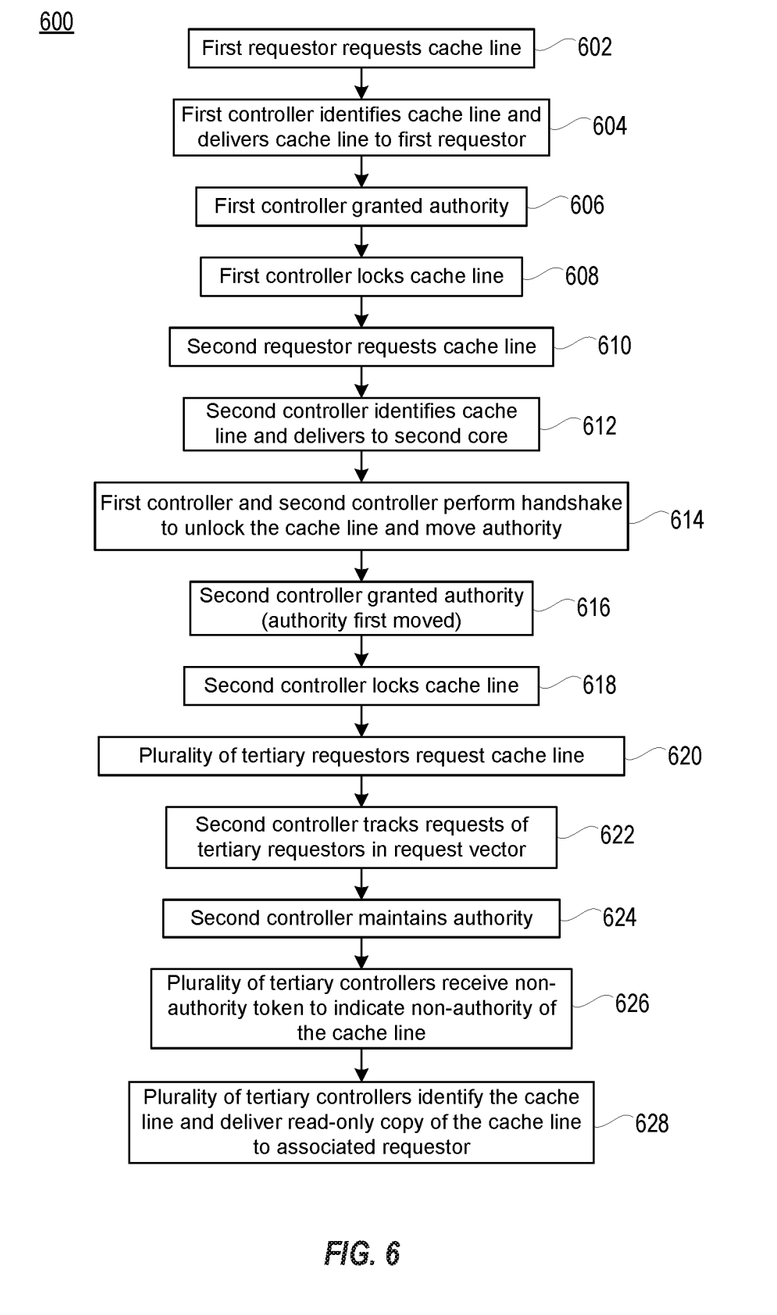
FIG. 6 depicts a flow diagram of method for controller address contention assumption, according to one or more embodiments of the invention.

FIG. 6 depicts a flow diagram of a computer-implemented method for controller address contention assumption according to one or more embodiments of the present invention. At block 602, a primary controller 510 receives a first fetch request by a first requesting agent. For example, controller 510a receives the first fetch request for cache line 522 from core 302a. As indicated above, each controller 510 is in operable communication with a respective unique requesting agent. Thus, each controller 510 is not shared by multiple requesting agents.

At block 604, the primary controller 510 fetches associated requested data from shared cache 520 for the first requesting agent. For example, controller 510a fetches data 526 from shared cache 520 for core 302a.

At block 606, the primary controller 510 is granted authority of the cache line associated with the requested data. For example, controller 510a receives an authority token 529 (from a previous authority, from an authority granting entity, etc.) that grants and/or permits controller 510a to acknowledge authority of cache line 522 associated with the requested data 526.

At block 608, the primary controller 510 uses a synchronization mechanism to lock the requested data from being accessed by any other requesting agent. For example, controller 510a locks the cache line 522 from being accessed by the other cores 302b, 302c, 302d, 302e until the first core 302a releases authority of the cache line 522.

At block 610, a secondary controller 510 receives a second fetch request by a second requesting agent. For example, controller 510b receives the second fetch request for cache line 522 from core 302b.

At block 612, primary controller 510 and secondary controller 510 perform a handshake. During the handshake, primary controller 510 and secondary controller 510 may exchange information including the identity of its requesting agent, the type of operation the data is requested for, and may acknowledge the exchange. For example, controller 510a and secondary controller 510a perform the handshake.

At block 614, the secondary controller 510 is granted authority of the cache line associated with the requested data. The transfer of authority from the primary controller 510 to the secondary controller 510 may be a result of the primary controller 510 accepting the handshake information from the secondary controller 510. In accepting the handshake information from the secondary controller 510, primary controller 510 may effectively release authority of the cache line associated with the requested data. For example, controller 510b receives an authority token (from controller 510a, from the granting authority, etc.) that grants and/or permits controller 510b to acknowledge authority of cache line 522 associated with the requested data 526.

At block 616, the secondary controller 510 fetches the associated requested data from shared cache 520 for the second requesting agent. For example, controller 510b fetches data 526 from shared cache 520 for core 302b.

At block 618, the secondary controller 510 uses a synchronization mechanism to lock the requested data from being accessed by any other requesting agent. For example, controller 510b locks the cache line 522 from being accessed by the other cores 302a, 302c, 302d, 302e until core 302b releases authority of the cache line 522 and/or until core 302b performs further address contention assumption processes described below.

At block 620, a plurality of tertiary controllers 510 receive a subsequent fetch request by its associated requesting agent. For example, controller 510c receives a subsequent fetch request for cache line 522 from core 302c, controller 510d receives a subsequent fetch request for cache line 522 from core 302d, and controller 510e receives a subsequent fetch request for cache line 522 from core 302e. These subsequent fetch requests may occur simultaneously, near simultaneously, overlapping, or the like. In response to such subsequent fetch requests, the secondary controller receives an address compare request from the plurality of tertiary controllers 510. When the address 524 of the subsequently requested data 526 does match (i.e., same data), the requesting plurality of tertiary controllers 510c, 510d, 510e remain in a hold position until core 302b performs further address contention assumption processes described below.

At block 622, the secondary controller 510 tracks the identity of the intervening requesting tertiary controllers 510. For example, controller 510b may store the identity of the requesting controllers 510c, 510d, and 510e in request vector 512, queue, table, or the like. Controller 510b may also track the operation type associated with the subsequent requests in request vector 512, queue, table, or the like.

At block 624, secondary controller 510 maintains authority of the cache line associated with the requested data by the requesting tertiary controllers 510. As part of this process, the secondary controller 510 and the plurality of tertiary controllers 510 may exchange information to establish that authority of the cache line 522 is the still the responsibility of secondary controller 510. The exchange of information may include the process of negotiation between the second controller 510 and the plurality of tertiary controllers 510. For example, controller 510b and controllers 510c, 510d, and 510e exchange information to establish that authority of the cache line 522 is the still the responsibility of controller 510b and determine such associated authority and/or data transfer protocol(s).

At block 626, the plurality of tertiary controllers 510 receive a non-authority token 530, respectively. For example, controller 510c, 510d, 510e receives a non-authority token (from controller 510b, from the granting authority, etc.) that indicates controller 510c, 510d, 510e does not have authority of cache line 522 and/or blocks controller 510c, 510d, 510e from acknowledging authority of cache line 522, respectively.

At block 628, if the tertiary controllers 510 are accessing data 526 for a read-only operation, the secondary controller 510 transmits or allows a read-only copy of data 526 to be fetched by the tertiary requesting agents in parallel, simultaneous, overlapping, or the like. For example, if the controllers 510c, 510d, 510e are accessing data 526 for a read-only operation, the controller 510b transmits or allows a read-only copy of data 526 to be fetched at the same time by controllers 510c, 510d, 510e, respectively, whom may then, in turn, provide, allow, or release such read-only copy of data 526 to the associated core 302c, 302d, 302e.

Additional process blocks may also be included. The method depicted in FIG. 6 represent illustrations, and that other process blocks may be added, or existing process blocks may be removed, modified, or rearranged without departing from the scope and spirit of the present disclosure.

As a result of the controller 510b maintaining authority and because of the subsequent tertiary controllers 510c, 510d, 510e receiving non-authority token 530c, 530d, 530e, respectively, resource utilization and processor stall times within the MP system are improved while enabling cache line authority coherency therewith.

Please refer to FIG. 3. For clarity, it is to be understood that there may be multiple owners of a cache line, but only one authority of the cache line at each system level. In certain embodiments, authority token 529 may further specify a level within the MP system in which the holding controller has authority. For example, a controller may have authority of the associated cache line at a processing chip level, at a processing drawer level, at an entire system level, or the like.

Controller 206 may hold an authority token 529 establishing it as having authority of the associated cache line at a processing chip level. The processing chip level of authority may permit controller 206 to transmit authority of the associated cache line to only controllers 210, 214 (i.e., those other controllers within the same processing chip 203.*a*). In embodiments of the present invention, the controller 206 that holds authority token 529 specifying processing chip level authority over the associated cache line, may also further distribute or otherwise allow only controllers 210, 214 obtain non-authority token 530 to the associated cache line.

Alternatively, controller 206 may hold an authority token 529 establishing it as having authority of the associated cache line at a processing drawer level. The processing drawer level of authority may permit controller 206 to transmit authority of the associated cache line to controllers 210, 214 within the same processing chip 203.*a* and to controllers 226, 230, and 234 (i.e., those other controllers within the same processing drawer 201.*a*), if no processing chip level authority exists on those other processing chip(s) within the same processing drawer 201.*a*.

If drawer level authority is transmitted from controller 206 to another controller on the same chip 203.*a*, controller 206 may be downgraded to non-authority 530 (e.g., authority token 529 is removed or revoked and replaced with non-authority token, etc.). If drawer level authority is transmitted from controller 206 to a controller on a different chip 203.*b* on the same drawer 201.*a*, controller 206 may be downgraded to chip level authority.

In embodiments of the present invention, the controller 206 that holds authority token 529 specifying processing drawer level authority over the associated cache line, may also further distribute or otherwise allow only controllers 210, 214 (i.e., controllers on the same processing chip 203.*a*) obtain non-authority token 530 to the associated cache line. Further, controller 206 may distribute or otherwise allow 226, 230, and 234 (i.e., those other controllers within the other chip 203.*b* in the same processing drawer 201.*a*) to receive processing chip level authority tokens 529 for that specific cache line, if chip level authority does not already exist on that chip 203.*b*.

Alternatively, controller 206 may hold an authority token 529 establishing it as having authority of the associated cache line at an entire system level. The processing system level of authority may permit controller 206 to transmit authority of the associated cache line to controllers 210, 214 within the same processing chip 203.*a* and to controllers 226, 230, and 234 (i.e., those other controllers within the same processing drawer 201.*a*) and to controllers 246, 250, 254, 266, 270, and 274 (i.e., those other controllers within a different same processing drawer 201.*b* within the same MP computing system 200).

If system level authority is transmitted from controller 206 to another controller on the same chip 203.*a*, controller 206 may be downgraded to non-authority 530. If system level authority is transmitted from controller 206 to a controller on a different chip 203.*b* on the same drawer 201.*a*, controller 206 may be downgraded to chip level authority. If system level authority is transmitted from controller 206 to a controller on a different drawer 201.*b*, controller 206 may be downgraded to drawer level authority.

In embodiments of the present invention, the controller 206 that holds authority token 529 specifying processing system level authority over the associated cache line, may also further distribute or otherwise allow only controllers 210, 214 obtain non-authority token 530 to the associated cache line. Further, controller 206 may distribute or otherwise allow controllers 226, 230, and 234 (i.e., those other controllers within the other chip 203.*b* in the same processing drawer 201.*a*) to receive processing chip level authority tokens 529 for that specific cache line, if chip level authority does not already exist on that chip 203.*b*. Even further, controller 206 may distribute or otherwise allow controllers 246, 250, 254, 266, 270, and 274 (i.e., those other controllers within a different drawer 201.*b* in the same system 200) to receive processing drawer level authority tokens 529 for that specific cache line, if a drawer scope authority does not already exist in that processing drawer 201.*b*.

For clarity, authority of a cache line is not based on the type or location of a controller, but rather, an authority that is assigned to the associated control over the associated cache line for each cache line in the system. A controller that holds system level authority of the associated cache line may complete the associated operation and later operate on a different cache line with processing chip level of authority. In these embodiments, therefore, a cache line can have only one designated controller within the entire system that has system level authority thereof, a cache line can have only one designated controller within the same drawer that has processing drawer level authority thereof, a cache line can have only one designated controller within the same processing chip that has processing chip level authority thereof, or the like.

In certain embodiments, non-authority token 530 may further specify a level within the MP system in which the holding controller has non-authority. For example, a controller may have non-authority of the associated cache line at a processing chip level, at a processing drawer level, at an entire system level, or the like.

Controller 206 may hold a token 529 establishing it as having non-authority of the associated cache line at a processing drawer level but authority of the associated cache line at a processing chip level. The processing chip level of authority may permit controller 206 to transmit read-only ownership of the associated cache line to only controllers 210, 214 (i.e., those other controllers within the same processing chip 203.*a*), but the processing drawer level of non-authority does not permit controller 206 to transmit read-only ownership of the associated cache line to controllers 226, 230, 234 (i.e., those other controllers outside the same processing chip 203.*a*).

Alternatively, controller 206 may hold a token 529 establishing it as having non-authority of the associated cache line at a processing system level but authority of the associated cache line at a processing drawer level. The processing drawer level of authority may permit controller 206 to transmit read-only ownership of the associated cache line to controllers 210, 214 within the same processing chip 203.*a* and to controllers 226, 230, and 234 (i.e., those other controllers within the same processing drawer 201.*a*), but the processing system level of non-authority does not permit controller 206 to transmit read-only ownership of the associated cache line to controllers 246, 250, 254, 266, 270, 274 (i.e., those other controllers outside the same processing drawer 201.a). The processing drawer level of authority may permit controller 206 to transmit processor chip level of authority and processor drawer level of non-authority to one of controllers 226, 230, 234. Without loss of generality, if controller 226 receives processor chip level authority, controller 226 may initiate the process outlined by FIG. 6, wherein controller 226 takes the role of the second requestor beginning in step 612. Controllers 230 and 234 may then act as the tertiary controllers requesting the cache line in steps 620 and beyond.

Alternatively, controller 206 may hold an authority token 529 establishing it as having authority of the associated cache line at an entire system level. The entire system level of authority may permit controller 206 to transmit read-only ownership of the associated cache line to all controllers 210, 214, 226, 230, 234, 246, 250, 254, 266, 270, 274 (i.e., those other controllers within the same MP computing system 200). The entire system level of authority may permit controller 206 to transmit processor chip level of authority and processor drawer level of non-authority to one of controllers 226, 230, 234. Without loss of generality, if controller 226 receives processor chip level authority, controller 226 may initiate the process outlined by FIG. 6, wherein controller 226 takes the role of the second requestor beginning in step 612. Controllers 230 and 234 may then act as the tertiary controllers requesting the cache line in steps 620 and beyond. The entire system level of authority may permit controller 206 to transmit processor drawer level of authority and entire system level of non-authority to one of controllers 246, 250, 254, 266, 270, 274. Without loss of generality, if controller 246 receives processor drawer level authority, controller 246 may initiate the process outlined by FIG. 6, wherein controller 246 takes the role of the second requestor beginning in step 612. Controllers 250 and 254 may then act as the tertiary controllers requesting the cache line in steps 620 and beyond. Alternatively, controllers 266, 270, 274 may then act as the tertiary controllers requesting the cache line in steps 620 and beyond, which could result in one of controllers 266, 270, 274 receiving processor chip level of authority and initiating an addition iteration of the process outlined in FIG. 6.

For clarity, authority of a cache line is not based on the type or location of a controller, but rather, an authority that is assigned to the associated control over the associated cache line for each line in the system. A controller that holds system level authority of the associated cache line may complete the associated operation and later operate on a different cache line with processing chip level of authority. In these embodiments, therefore, a cache line can have only one designated controller within the same system that has system level authority thereof, a cache line can have only one designated controller within the same drawer that has processing drawer level authority thereof, a cache line can have only one designated controller within the same processing chip that has processing chip level authority thereof, or the like.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. Various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram, or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/ connections therebetween. All these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    receiving, by a first controller, a fetch request for data of a cache line from each of a plurality of subsequent controllers;
    performing, by the first controller, an address compare using a memory address of the data;
    in response to the memory address matching a memory address stored in the first controller, maintaining, by the first controller, authority of the cache line;
    transmitting, by the first controller, a respective non-authority token to the each of the plurality of subsequent controllers; and
    in response to each of the plurality of subsequent controllers holding the respective non-authority token, transmitting, by the first controller, the data to each of the plurality of subsequent controllers.

2. The computer-implemented method of claim 1, wherein the non-authority token identifies the first controller having authority of the cache line and identifies the plurality of subsequent controllers as not having authority of the cache line.

3. The computer-implemented method of claim 2, wherein each of the plurality of subsequent controllers comprise a plurality of sub-controllers, wherein the non-authority token is transmitted from each of the plurality of subsequent controllers to each of the plurality of sub-controllers comprised there within, respectively.

4. The computer-implemented method of claim 2, further comprising:
    storing, by the first controller, an identity of each of the plurality of subsequent controllers in a request vector.

5. The computer-implemented method of claim 1, wherein the first controller transmits the data to each of the plurality of subsequent controllers in parallel.

6. The computer-implemented method of claim 1, wherein the first controller manages fetching data from a shared cache to a single associated first core and wherein each of the plurality of subsequent controllers manages fetching data from the shared cache to a different associated core, respectively.

7. The computer-implemented method of claim 6, wherein the first controller manages fetching data from the shared cache to the single associated first core through a single non-shared cache and wherein each of the plurality of subsequent controllers manages fetching data from the shared cache to the different associated core through a different non-shared cache, respectively.

8. A system comprising:
    a memory having computer readable instructions; and one or more processors for executing the computer readable instructions, the computer readable instructions controlling the one or more processors to perform operations comprising:
    receiving, by a first controller, a fetch request for data of a cache line from each of a plurality of subsequent controllers;
    performing, by the first controller, an address compare using a memory address of the data;
    in response to the memory address matching a memory address stored in the first controller, maintaining, by the first controller, authority of the cache line;
    transmitting, by the first controller, a respective non-authority token to the each of the plurality of subsequent controllers; and
    in response to each of the plurality of subsequent controllers holding the respective non-authority token, transmitting, with first controller, the data to each of the plurality of subsequent controllers.

9. The system of claim 8, wherein the non-authority token identifies the first controller having authority of the cache line and identifies the plurality of subsequent controllers as not having authority of the cache line.

10. The system of claim 9, wherein each of the plurality of subsequent controllers comprise a plurality of sub-controllers, wherein the non-authority token is transmitted from each of the plurality of subsequent controllers to each of the plurality of sub-controllers comprised there within, respectively.

11. The system of claim 9, further comprising:
    storing, by the first controller, the identity of each of a plurality of subsequent controllers in a request vector.

12. The system of claim 8, wherein the first controller transmits the data to each of the plurality of subsequent controllers in parallel.

13. The system of claim 8, wherein the first controller manages fetching data from a shared cache to a single associated first core and wherein each of the plurality of subsequent controllers manages fetching data from the shared cache to a different associated core, respectively.

14. The system of claim 13, wherein the first controller manages fetching data from the shared cache to the single associated first core through a single non-shared cache and wherein each of the plurality of subsequent controllers manages fetching data from the shared cache to the different associated core through a different non-shared cache, respectively.

15. A computer program product comprising a computer readable storage medium having program instructions embodied therewith, the program instructions executable by a processor to cause the processor to perform operations comprising:
- receiving, by a first controller, a fetch request for data of a cache line from each of a plurality of subsequent controllers;
- performing, by the first controller, an address compare using a memory address of the data;
- in response to the memory address matching a memory address stored in the first controller, maintaining, by the first controller, authority of the cache line;
- transmitting, by the first controller, a respective non-authority token to the each of the plurality of subsequent controllers; and
- in response to each of the plurality of subsequent controllers holding the respective non-authority token, transmitting, with first controller, the data to each of the plurality of subsequent controllers.

16. The computer program product of claim 15, wherein the non-authority token identifies the first controller as having authority of the cache line and identifies the plurality of subsequent controllers as not having authority of the cache line.

17. The computer program product of claim 16, wherein the first controller holds an authority token establishing that the first controller has authority of the cache line.

18. The computer program product of claim 17, wherein the authority token specifies that the first controller has chip level authority of the cache line.

19. The computer program product of claim 15, wherein the first controller transmits the data to each of the plurality of subsequent controllers in parallel.

20. The computer program product of claim 15, wherein the first controller manages fetching data from a shared cache to a single associated first core and wherein each of the plurality of subsequent controllers manages fetching data from the shared cache to a different associated core, respectively.

* * * * *